Feb. 13, 1962   D. H. DE MOTT   3,021,096
INFRARED GUIDANCE SYSTEM
Filed Dec. 7, 1956   2 Sheets-Sheet 1
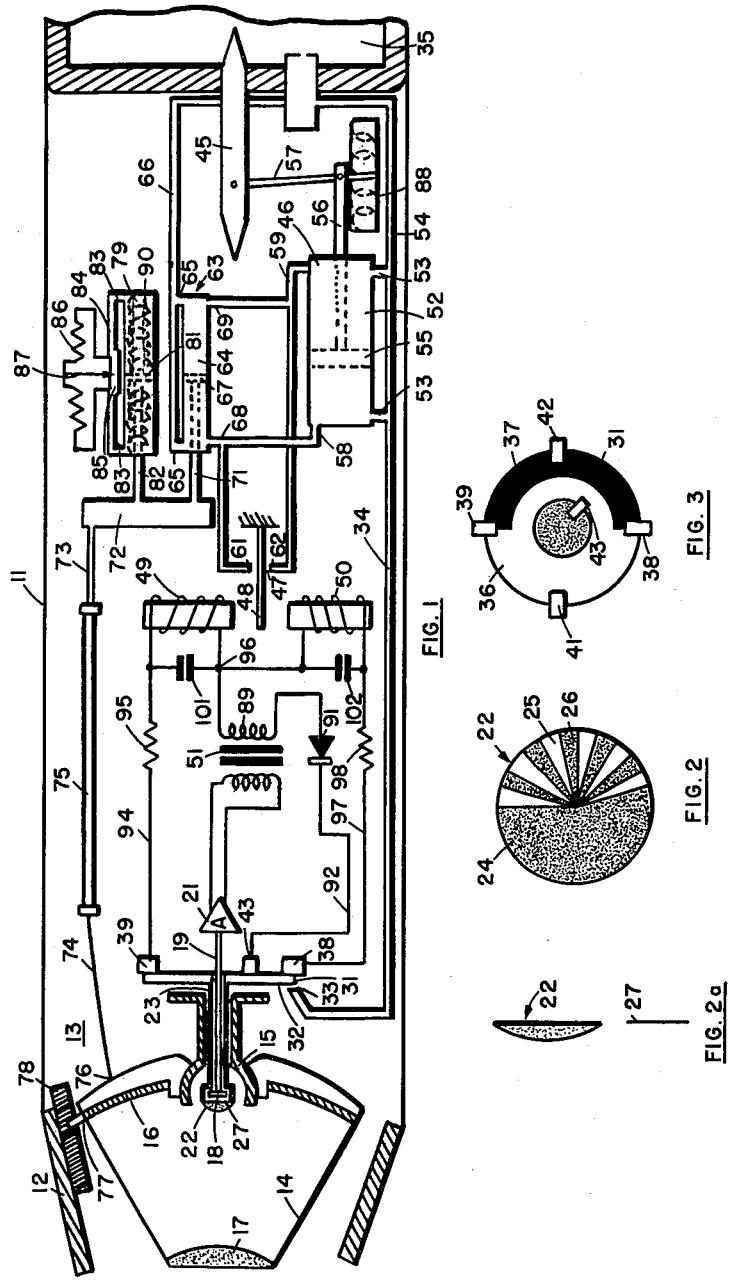
INVENTOR.
DALE H. DE MOTT
BY Frederic B. Schramm
ATTORNEY

INVENTOR.
DALE H. DE MOTT

3,021,096
Patented Feb. 13, 1962

3,021,096
INFRARED GUIDANCE SYSTEM
Dale H. De Mott, Los Angeles, Calif., assignor to
North American Aviation, Inc.
Filed Dec. 7, 1956, Ser. No. 627,028
21 Claims. (Cl. 244—14)

This invention relates to guidance of movable objects and concerns particularly guidance systems in which an object is directed toward a source of infrared radiation.

An object of the invention is to achieve increased accuracy, efficiency and effectiveness of the guidance of objects, such as rockets and to accomplish effective striking of rapidly moving or maneuvering targets.

Various forms of navigation for missiles have been proposed, such as pursuit navigation, lead collision navigation, constant bearing approach navigation, etc. In pursuit navigation, the missile approaches its target from the rear no matter how it is originally launched and its acceleration must exceed that of the target at the end of the time of flight. In lead collision navigation the missile calculates a lead course and then maintains a lead angle on the target. This is desirable in achieving effective strikes on the target but requires elaborate computing apparatus. In constant true bearing navigation accelerations are never required other than accelerations comparable to those of the target but means for comparing orientation are required with a reference such as provided by a gyroscope system.

In small missiles, such as small rocket devices, the utmost of simplicity is desirable with a minimum number and weight of parts in order to achieve enhanced reliability at reduced cost of apparatus and storage, increased carrying capacity for equipment utilized to transport or release the missiles and in order to eliminate or minimize maintenance problems in the case of missiles stored for considerable periods of time. Small, compact missiles are desired in order that an adequate number of rounds can be stowed in inboard launching racks.

It is accordingly an object of the invention to avoid the disadvantages of heretofore available apparatus and to provide improved, reliable, relatively inexpensive methods and apparatus for the guidance of moving objects and for locating and striking moving targets.

More specifically, an object of the invention is to guide a missile by causing it to deviate from its initial direction in such a way that its path emerges smoothly into a collision course.

Other objects of the invention are to guide moving objects with a minimum number of parts and with elimination of sensitive, delicate or expensive parts, or parts which require appreciable power or energy for maintenance and reliable operation.

Other and further objects, features and advantages of the invention will become apparent as the description proceeds.

In order to achieve these advantages, a principle of operation is employed in accordance with this invention which is referred to as "proportional navigation" in which the rate of turn of the missile is maintained proportional to the rate of change of bearing of the target as seen by the missile.

In carrying out the invention in accordance with a preferred form thereof, a movable object, such as a missile is provided with an infrared receiver which is movably mounted in the nose of the missile in such a way that its optical axis may vary in angle with respect to the line of flight of the missile. Suitable mechanism, such as horizontal and vertical rudder vanes are provided for controlling the course of the missile and an infrared detector is so mounted in the receiver to be responsive to deviations between the optical axis of the receiver and the relative bearing of the target or source of infrared radiation. Mechanism is provided for deflecting the rudder vanes in response to the infrared detection in such a manner as to decrease the deviations.

Additional mechanism is provided for adjusting the angular position of the receiver with respect to the missile such that the deviation between the optical axis of the receiver and the bearing of the target or infrared source is increased. However, the arrangement is such that the receiver angle variation is effected more slowly than the correction in the direction of flight of the missile so as to avoid losing the target.

A better understanding of the invention will be afforded by the following detailed description considered in conjunction with the accompanying drawings in which FIG. 1 is a schematic diagram partially in section of one embodiment of the invention;

FIG. 2 is a diagram of a reticle employed in the optical system of the apparatus of FIG. 1;

FIG. 3 is a diagram of a distributor employed in the control mechanism in conjunction with the reticle of the apparatus of FIG. 1.

Like reference characters are utilized throughout the drawings to designate like parts.

Figure 4:
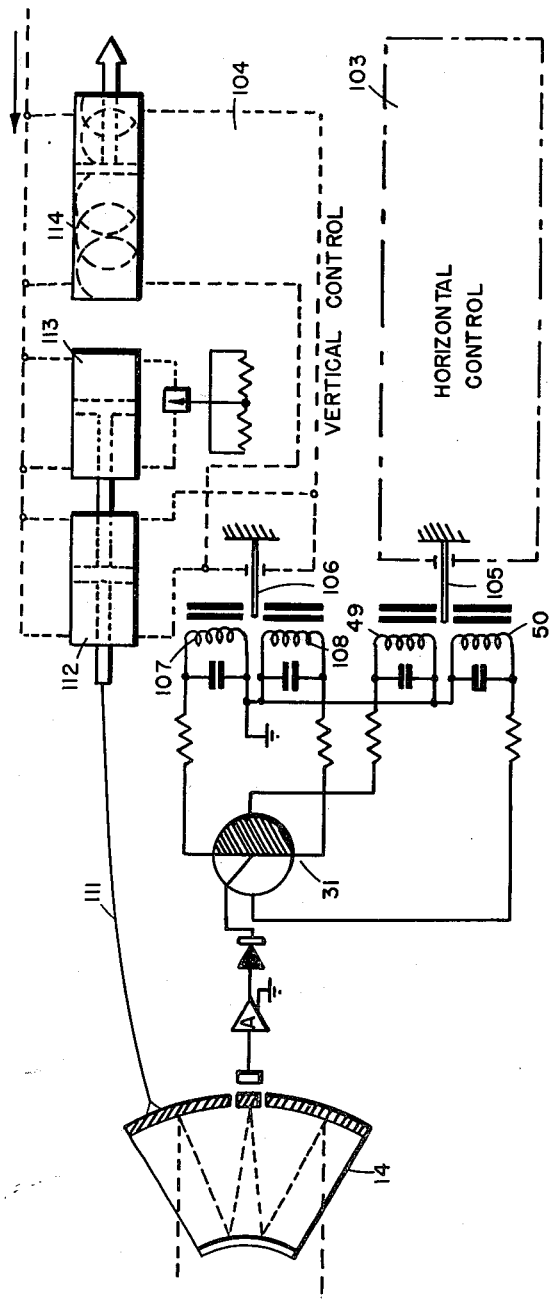
FIG. 4 is a schematic diagram of a modification of the apparatus of FIG. 1 in which the arrangement for both vertical and horizontal rudders is illustrated.

As shown in FIG. 1, a missile, such as a rocket propelled missile, is provided with a flight control and guidance mechanism near the nose within a portion of the missile surrounded by a shell 11. At the forward end of the shell 11 there is a nose cone, hemisphere or pyramid 12 of material which will pass thermal radiation. Such material as arsenic triselenide or arsenic trisulphide may be employed for example. This material absorbs 80% of the radiant energy in sunlight, but passes 90% of the radiation from jet aircraft. This increases the selectivity of the apparatus to desired targets and reduces the effect of background radiation. Preferably, the window forming the nose 12 is a four-sided pyramid composed of flat plates because they afford an acceptable aerodynamic shape while not causing deviation or defocusing of the radiation.

Immediately behind the nose cone 12 there is a receiver 13 comprising an optical system 14 of the Cassegrainian type, for example, which is movably mounted upon a ball and socket joint 15. The optical system includes a primary parabolic mirror 16 and a secondary parabolic or plane mirror 17 for focusing radiation upon an infrared cell 18.

In the arrangement as described, the infrared cell 18 is mounted at a fixed position with respect to the shell 11 at the spherical center of the ball and socket joint 15. Infrared detector 18 may, for example, be mounted upon the end of a stationary rod or tube 19 carrying a pair of conductors from the detector 18 to a transistor amplifier 21 as indicated schematically. The infrared detector 18 may be of any suitable type, preferably a relatively sensitive type such as a lead sulphide cell which is sufficiently sensitive to detect a jet engine at a distance of 4,000 yards.

In conjunction with the optical system 14, there is a reticle 22 mounted upon the end of a rotatable hollow shaft 23 in such a manner that the reticle 22 may rotate with respect to the optical system 14 in the receiver 13.

The reticle 22 comprises a transparent or translucent member in the form of a circle, one-half of which such as the semi-circle 24 is opaque and the other half of which comprises alternating translucent and opaque spokes or sectors 25 and 26. The reticle 22 may be formed by photo-etching an evaporated metallic film on the flat side of transparent member 27 composed of glass or the like, which may constitute a field lens or a cover glass. The cover glass 27 may be composed of a filter material to reduce background radiation and merge the clouds and sky in which case the target becomes a silhouette.

Mounted upon the same hollow shaft 23 there is a distributor 31, a plan view diagram of which is shown in FIG. 3.

The distributor 31 is arranged to be rotatable by means of an air turbine comprising vanes (not shown) on the back surface 32 of the distributor 31 cooperating with a nozzle 33 supplied with air or gas under pressure through a line 34 from a high pressure bottle 35 filled under pressure with a fluid such as helium gas or the like, which is both light and inert.

The distributor 31 comprises a conducting strip or plate 36 with a semicircular insulating plate 37 and pairs of brushes 38 and 39 at the end of one diameter, and 41 and 42 at the end of a diameter perpendicular to the line of brushes 38 and 39. There is a brush 43 also contacting the conducting plate 36 at any position thereof.

For steering the missile, rudders or vanes 45 are provided which are controlled by a hydraulic or pneumatic motor 46 provided with gas under pressure from the high pressure bottle 35. For controlling the pneumatic motor 46 a two-way valve 47 is provided having an operating reed 48 responsive to solenoids 49 and 50 which are energized selectively by the amplifier 21 in response to the detector 18. In the arrangement illustrated, the detector 18 is connected to the input of amplifier 21, the output of which is connected through a transformer 51 and the distributor 31 to the solenoids 49 and 50 in such a manner that one solenoid or the other is energized depending upon the half-circle in which the image of an infrared source is projected through the reticle 22 upon the infrared detector 18. It is to be understood that for simplicity in FIG. 1 only one vane 15, e.g., for controlling azimuth, and the connections to one pair of distributor brushes 38 and 39 are shown, but that a second vane or pair of vanes or rudder means for controlling elevation would also be provided.

The pneumatic motor 46 comprises a cylinder 52 with inlet ports 53 from a line 54 connected to the high pressure bottle 35, a piston 55 connected by a rod 56 to a crank 57 attached to the rudder vane 55, and exhaust ports 58 and 59. The ports 58 and 59 are connected to orifices 61 and 62, respectively, of the valve 47 operated by the vane 48. Orifices 61 and 62 of the valve 47 are arranged to bleed pressure from one side or the other of the piston 55, when the reed 48 is deflected in one direction or the other by solenoid windings 49 or 50, to bring about movement of the piston 55.

For controlling the angular position of the optical system 14 and the receiver 13 with respect to the same axis as is controlled by the rudder vane 45, a second pneumatic motor system 63 is provided comprising a cylinder 64 with inlet ports 65, connected through a line 66 to the high pressure bottle 35 and a piston 67. Outlet ports 68 and 69 are connected to the same valve orifices 61 and 62, respectively, as outlet ports 58 and 59. In consequence, the reed type valve 47 also controls the pneumatic motor system 63. Its piston 67 is connected through a rod 71 and a bracket arm 72 to a rod 73 connected to a flexible wire 74, such as a Bowden wire, slidable in a sheath 75. The end 76 of the wire 74 is connected to the optical system 14.

For deflecting the optical system 14 around an axis perpendicular to that controlled by wire 76, it is to be understood that a second wire (not shown) would be connected thereto at a point 90 degrees from the point 76 and controlled by a second piston system. Suitable means, such as a slot or link arrangement, is provided for preventing the optical system from twisting around the axis of the shell 11. For example, a pin 77 may be secured to the edge of the optical system 14 adjusted to slide in a groove in a block 78 secured to the inner surface of the cone 12, such that the pin 77 may slide longitudinally and also permit rotation around its axis, and the optical system 14 is deflected about either of two mutually perpendicular axes or both simultaneously.

In order to cause motion of the optical system 14 to lag or take place more slowly than that of the rudder or vane system represented by the vane 45, a dash pot cylinder 79 is provided having a piston 81 therein connected by a rod 82 to the bracket 72 driving the push rod 73 of the optical system movement. The space within dash pot cylinder 79 is occupied by a suitable fluid, such as air or oil, such that displacement of the piston 81, when the optical system moves, requires displacement of the fluid through end ports 83 and a return pipe 84 partially closed by an adjustable valve 85.

In order to cause the restriction provided by the valve 85 to be adjustable automatically with variations in altitude and, therefore, with variations in the density of the atmosphere, an aneroid diaphragm 86 is provided having a valve stem 87 connected thereto fitting in the orifice of the valve 85 in such a manner that the restriction of the valve 85 is increased with fall in barometric pressure for the purpose of increasing the lag of the response of the optical system at higher altitudes when the air density is lower and the speed of response of the missile to changes in setting of the vane 45 is reduced.

Preferably, return springs 88 are provided for normally maintaining the rudder 45 in the center or neutral position. Likewise, return springs 90 may be provided in the dash pot 79 to restore the optical system to symmetrical position in the shell 11.

A control circuit is formed including a secondary winding 89 of the transformer 51, a rectifier 91, a conductor 92, distributor brush 43, conducting plate 36 of the distributor 31, and whichever one of the outer brushes 38 or 39 is in contact with conducting plate 36. For example, through brush 39, conductor 94, resistor 95, and solenoid winding 49, back to junction terminal 96 at one end of winding 89; or through brush 38, conductor 97, resistor 98, and solenoid winding 50, back to junction terminal 96. Preferably, the windings 49 and 50 are shunted by condensers 101 and 102, respectively.

Whenever the boresight of the optical system 14 deviates from the actual bearing of the target with respect to the missile shell 11, the image of the target in infrared radiation falling from the parabolic mirror 16 and being reflected by the mirror 17 is focused upon the infrared detector cell 18 through a portion of the reticle 22 displaced from the center thereof. Consequently, as the reticle 22 is rotated by the turbine 32, intermittent pulses are applied to the input of the amplifier 21 corresponding to the speed with which the transparent and opaque portions 25 and 26 of the reticle 22 sweep across the image of the infrared source. Alternating current is, therefore, generated in the amplifier 21 and in the transformer 51. The distributor is so arranged that the conducting portion 36 corresponds to the semi-circle of the reticle 22 having the alternating transparent and opaque portions 25 and 26 so that signals transmitted through the amplifier 21 are applied to the appropriate one of the brushes 38, 39.

For this reason, the reticle 22 renders the apparatus responsive to the deviation between the boresight of the optical system and the bearing of the infrared source relative to the missile shell 11 and therefore the valve reed 48 is deflected in whichever direction is necessary to actuate the rudder vane 45 in the direction required to correct the motion. Moreover, because of the fact that the transparent sectors 25 increase in width as the distance from the center of the reticle 22 increases, the strength of the impulse is increased with increases in deviation, so that the valve vane 48 is more strongly attracted away from one or the other orifices 61 or 62. This increases the leakage of pressure from one end or the other of the cylinder 52 for increasing the speed of response of the rudder vane 45.

It has already been pointed out that the selective absorption characteristics of the arsenic triselenide plates forming the nose cone or pyramid 12 increased the sensitivity of response of the apparatus by reducing the effect of background radiation. Further reduction of the effect of such background radiation results from the relatively narrow field of view provided by the nose 12 and the effect of background deviation is reduced still further by use of the rotating reticle 22. Background radiation from sky or sunlight fills the entire optical system so that the alternate clear and opaque spokes or sectors of the reticle 22 as swept around in the optical field of view cause no variaiton in the radiation falling upon the infrared cell 18. The desired target, however, such as hot exhaust of a jet engine forms a relatively small target which is focused upon a portion of the reticle producing a small image which is occulted intermittently by passage of the clear and opaque sectors. Consequently, complete modulation of the energy in the small images of the target resulted; but there is no modulation of any energy received from the large images of the background.

It will be understood that the cell 18 and the amplifier 21 are connected to pass and amplify only the alternating current signals generated by the target. The effect is further improved by tuning the amplifier to a harmonic of the frequency with which the spokes interrupt the radiation. Consequently, excellent results are obtained during daylight operation as well as during night time operation.

Since the valve 47 also controls the piston 67 for controlling the movement of the optical system 14, deviation between the boresight and the relative bearing of the infrared source also causes movement of the optical system 14. However, the optical system 14 is so connected that it is moved in the opposite direction so as to increase the deviation instead of decreasing it. The resulting increased strength of error signal causes the rate of turn of the missile to increase the increase in the rate of change of the bearing of the targe relative to the missile so that the course of the missile emerges smoothly from its original course into a collision course with the infrared source.

It will be understood that for elevation control, rudder vanes corresponding to the rudder 45 are provided. Likewise, a second pair of solenoids corresponding to the solenoids 49 and 50 and aligned perpendicular thereto are provided for deflecting the valve reed 48 with respect to a second pair of valve orifices (not shown) for controlling a second set of pneumatic motors (not shown) for elevation control.

As shown in FIG. 4, separate horizontal and vertical controls 103 and 104 may be provided each with a separate control valve 105, 106, respectively. One pair of valve actuating solenoids 49 and 50 serves to control the vane of the valve 105 and a second pair of solenoids 107 and 108 serves to control the vane of the valve 106. For vertical control, a second wire system 111 is provided to control the movement of the optical system 14 around the axis perpendicular to that corresponding to the axis controlled by the wire 74 of FIG. 1. Optical system deflection control, dash pot delay, and vertical flight control cylinders 112, 113 and 114, respectively, are provided corresponding to the cylinders 63, 79 and 52 of FIG. 1.

It will be observed that the field of view of the optical system is divided not into four quadrants but into two pairs of independent half-circles which are 90 degrees apart in space phase which results from the fact that the reticle is divided into two half-circles, one of which is opaque and the other consists of alternate clear and opaque sectors, in addition to the fact that the distributor 31 is divided into conducting and insulating portions, each 180 degrees in angular extent. Moreover, the distributor 31 carries a pair of brushes 38 and 39 at the end of one diameter for cooperating with solenoids 49 and 50 and carries a second pair of brushes 41 and 42 at the end of another diameter perpendicular to the first for cooperating with the second set of solenoid windings.

Although the invention is not limited to a particular type of amplifier satisfactory results have been achieved by the employment of a grounded emitter junction type of amplifier, as the amplifier 21. The output stage is at low impedance and the signal from it is rectified by the rectifier 91 and returned to the distributor 31 which rotates with the reticle 22. Each of the electromagnets or solenoids controlling the valve 47 may receive energy during the entire time that the half-circle of the reticle is in the half cycle of the sky corresponding to that solenoid.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A movable dirigible object adapted to move toward a source of infrared radiation comprising in combination a shell, a receiver within the shell movable with respect thereto, an infrared detector, an optical system in the receiver for directing infrared radiation upon the detector, propelling means for the shell, means for deflecting the receiver within the shell so as to increase the deviation of said infrared source from the line of sight of said receiver, said deflecting means being responsive to the infrared detector, and means responsive to said detector for controlling the orientation of said object relative to said source of radiation so as to decrease the deviation of said source from the line of sight of said receiver.

2. A movable dirigible object adapted to move toward a source of infrared radiation comprising in combination a shell, a receiver within the shell movable with respect thereto, an infrared detector and an optical system in the receiver for directing infrared radiation upon the detector, said optical system comprising a rotatable reticle positioned between said radiation source and said detector, propelling means for the shell, movable vane means for the shell for controlling the direction of motion thereof, mechanism for deflecting the vane means, control mechanism for the vane deflecting mechanism responsive to the infrared detector, distributor means for selectively connecting the output of said detector in circuit with said control mechanism in accordance with the deviation of said radiation source from the line of sight of said optical system, and means for rotating said distributor means and said reticle in synchronism with each other.

3. Apparatus as in claim 2 wherein fluid under compression is employed as the propelling means, a fluid motor is employed as the vane deflecting means and the infrared detector responsive control has a solenoid actuated vane positioned to control the supply of fluid under pressure to said fluid motor.

4. Apparatus as in claim 3 wherein a second fluid motor is provided for changing the position of the receiver relative to the shell which is also responsive to the infrared detector control, the second fluid motor being arranged to move the receiver in such a position as to increase the deviation between the position of the receiver and the direction of the infrared source, and the first fluid motor is connected in such a way as to diminish the deviation between the direction of the shell and the infrared source.

5. Apparatus as in claim 4 wherein damping means are provided for retarding the response of the second fluid motor with respect to response of the first fluid motor.

6. An infrared guidance system comprising in combination with a source of infrared radiation, a dirigible movable object, a receiver mounted within said object and movable with respect thereto, movable directing means and propelling means, the receiver including an optical system for receiving radiation from the infrared source, an infrared detector selective to direction from which radiation is received, means for controlling the selective direction of radiation received by said infrared detector, a control for the directing means responsive to the infrared detector and the relative position of the selective direction of radiation received by said detector with respect to said object for deflecting the directing means in a direction dependent upon the position of the detector with respect to said object when infrared energy is detected thereby so as to decrease the intensity of response of the detector, mechanism responsive to the deflecting means control for moving the position of the receiver within the object in such a direction as to increase the intensity of the response of the detector, and means for delaying movement of the receiver compared with the movement of the deflecting means.

7. In a movable dirigible object, mechanism for orienting the object with respect to a source of infrared radiation comprising in combination a receiver movable with respect to the object, an infrared detector, an optical system in the receiver for directing infrared radiation upon the detector, movable vane means for the object for controlling the orientation thereof, mechanism for deflecting the vane means and control mechanism for the vane deflecting mechanism responsive to the infrared detector, and distributor means synchronized with said optical system for selectively connecting the output of said detector in circuit with said control mechanism.

8. In a movable dirigible object, mechanism for orienting the object with respect to a source of infrared radiation comprising a receiver movable with respect to the object, an infrared detector, an optical system in the receiver for directing infrared radiation upon the detector, means movable with respect to the object for altering its orientation responsive to the infrared detector, means for controlling said movable means, and distributor means synchronized with said optical system for selectively connecting the output of said detector in circuit with said controlling means.

9. Orienting mechanism as in claim 8 wherein the detector responsive means moves the receiver in such a direction as to increase the detector response.

10. Orienting mechanism as in claim 9 wherein the detector responsive means moves the orienting mechanism in such a direction as to decrease the detector response.

11. Orienting mechanism as in claim 10 wherein delaying means are introduced in the motion of the receiver.

12. Orienting mechanism as in claim 8 wherein the detector response means moves the orienting means in such a direction as to decrease the detector response.

13. In combination a dirigible object, radiation detector for discrete objects comprising a radiation responsive unit, means for focusing radiation upon the unit, a reticle interposed between the focusing means and the radiation responsive unit comprising alternating opaque and transparent sectors, means for rotating the reticle at a predetermined speed, an amplifier connected to said detector for producing electrical currents in response to modulation thereof by the reticle rotation, said amplifier being tuned to a frequency corresponding to the modulation frequency of the reticle at the said predetermined speed, means responsive to the position of rotation of said reticle for directing said dirigible object, output load means for receiving the output of said amplifier, and distributor means rotated in synchronism with said reticle for connecting the output of said amplifier to said load means in accordance with the deviation of said object from the line of sight of said unit.

14. In a movable dirigible object for flight in the atmosphere, orienting mechanism therefor comprising a receiver movable with respect to the object, a radiation detector, a focusing system in the receiver for directing radiation upon the detector, means responsive to the detector for moving the receiver relative to the object, means movable with respect to the object for altering its orientation responsive to the detector, means for delaying the relative orientation of the receiver with respect to the object, and means for varying such delay responsive to variations in barometric pressure.

15. A guidance system comprising a receiver sensitive to an object radiating energy in a different amount than its background and indicating the deviation of said object from the line of sight of said receiver, control surfaces connected to be responsive to the output of said receiver so as to minimize the deviation of said object from the line of sight of said receiver, means for controlling the direction of said receiver so as to increase the deviation of said object from the line of sight of said receiver.

16. A movable dirigible object comprising a body, a receiver directably mounted with respect to said body, said receiver being sensitive to an object having a source of radiation different than its background and indicating deviation of said object from the line of sight of said receiver, aerodynamic control surface means responsive to the output of said receiver so as to orient said body to minimize the deviation of said object from the line of sight of said receiver, and mechanism for directing said receiver with respect to said body so as to increase the deviation of said object from the line of sight of said receiver.

17. A movable dirigible object comprising a body, a receiver directably mounted with respect to said body, said receiver being responsive to an object radiating an amount of energy different than its background, said receiver further comprising a rotatable reticle adapted to modulate the energy received by said receiver according to the deviation of said object from the line of sight of said receiver, aerodynamic control surface means connected to said body, first motive means for controlling said control surfaces, said motive means connected to be responsive to the output of said receiver and to control said control surface means so as to minimize deviation of said radiating object from the line of sight of said receiver, second motive means connected to be responsive to the output of said receiver and to control the angular orientation of said receiver with respect to said body, the response of said second motive means being slower than the response of said first motive means, means for controlling said first and second motive means, and distributor means for selectively connecting the output of said receiver to said control means.

18. A movable dirigible object to be directed towards a target comprising a body, a receiver responsive to infrared radiation and mounted so as to be directable with respect to said body, first and second aerodynamic control surface means mounted angularly with respect to each other, first and second motive means connected to drive said first and second control surface means respectively, said receiver further comprising rotating reticle means disposed to modulate the energy received at said receiver according to the deviation of said target from the line of sight of said receiver, and distributor means connected to rotate synchronously with said reticle for connecting the output of said receiver alternately to said first and second motive means, said receiver-motive means connections being made according to the direction of deviation of said target from the line of sight of said receiver.

19. The combination recited in claim 18 wherein is included third motive means connected to control the direction of said receiver, said third motive means connected to be responsive to the output of said receiver.

20. The combination recited in claim 18 wherein is included third motive means connected to control the direction of said receiver with respect to said body, said third motive means connected to be responsive to the output of said receiver, and wherein the response of said third motive means is slower than the response of said first and second motive means.

21. The device as recited in claim 18 wherein each of said motive means comprises a pneumatic motor and a motor control for said motor comprising first and second solenoids connected alternately by said distributor means to the output of said receiver, said solenoids being actuated alternatively in accordance with the direction of deviation of said target from the line of sight of said receiver.

References Cited in the file of this patent
UNITED STATES PATENTS

| | | |
|---|---|---|
| 1,388,932 | Centervall | Aug. 30, 1921 |
| 2,418,137 | Noell | Apr. 1, 1947 |
| 2,603,433 | Nosker | July 15, 1952 |
| 2,713,134 | Eckweiler | July 12, 1955 |